United States Patent
Van Santen et al.

(10) Patent No.: US 6,649,093 B2
(45) Date of Patent: Nov. 18, 2003

(54) METHOD OF MANUFACTURING AN OPTICALLY SCANNABLE INFORMATION CARRIER

(75) Inventors: Helmar Van Santen, Eindhoven (NL); Gerard Eduard Van Rosmalen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 333 days.

(21) Appl. No.: 09/915,679

(22) Filed: Jul. 26, 2001

(65) Prior Publication Data

US 2002/0020821 A1 Feb. 21, 2002

(30) Foreign Application Priority Data

Aug. 8, 2000 (EP) .............................. 00202799

(51) Int. Cl.[7] ............................... B29D 11/00
(52) U.S. Cl. ................. 264/2.5; 264/1.33; 264/1.37; 425/174.4; 425/175; 425/810
(58) Field of Search .............. 264/1.33, 1.36, 264/1.37, 2.5, 106, 107; 425/174.4, 175, 810

(56) References Cited

FOREIGN PATENT DOCUMENTS

| DE | 199 52 806 | * | 5/2001 | |
|---|---|---|---|---|
| JP | 10255319 | | 9/1998 | ........... G11B/7/135 |

* cited by examiner

Primary Examiner—Mathieu D. Vargot

(74) Attorney, Agent, or Firm—Michael E. Belk

(57) ABSTRACT

The invention relates to a method of manufacturing a master mold (1), which is used to manufacture an optical information disc, such as a CD or DVD. According to the method, a substrate (3) is provided with a photosensitive layer (5), which is subsequently irradiated by means of a radiation beam (7), which is focused to a scanning spot (11) on said layer by means of an optical lens system (9). A liquid, such as water, is supplied into a gap (53) present between the photosensitive layer and an auxiliary lens (59) of the lens system facing said layer. As a result, the size of the scanning spot is decreased and the information density of the information disc to be manufactured is increased. According to the invention, the liquid is supplied via a supply opening (69) which is positioned immediately adjacent the auxiliary lens (59), in a direction which, viewed from the scanning spot (11), is contrary to a direction (Z) wherein the substrate (3) is moved with respect to the lens system (9). Thus, the liquid supplied via the supply opening is transported immediately and exclusively into said gap (53), so that the amount of liquid to be supplied to fill the gap is limited. The supply opening is formed in a wall portion (65), which extends in an imaginary plane in which also a side wall (63) of the auxiliary lens (59) facing the photosensitive layer is present. As a result, a homogeneous Couette flow of liquid without air inclusions is obtained in the gap. This Couette flow does not cause any undesirable mechanical vibrations of the lens system. The invention further relates to a method of manufacturing an optical information disc, according to which method a master mold (1) is manufactured in a first step, and the information disc is manufactured in a second step by means of a replica process using said master mold. The invention further relates to a device (25) for the manufacture of a master mold by means of a method according to the invention.

18 Claims, 4 Drawing Sheets

METHOD OF MANUFACTURING AN OPTICALLY SCANNABLE INFORMATION CARRIER

Figure 1A:
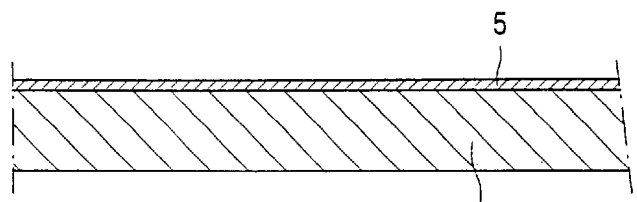

The invention relates to a method of manufacturing an optically scannable information carrier, which method comprises a first step wherein a master mold is manufactured, and a second step wherein, by means of the master mold or by means of a daughter mold manufactured by means of said master mold, the information carrier is manufactured by means of a replica process, in which first step a photosensitive layer provided on a substrate is irradiated by means of a modulated radiation beam which is focused to a scanning spot on the photosensitive layer by means of an optical lens system, the substrate and the lens system being moved relatively to each other, and a liquid being provided in a gap which is present between the photosensitive layer and a lens of the lens system facing said photosensitive layer.

The invention further relates to a method of manufacturing a master mold, which is used in the manufacture of an optically scannable information carrier, according to which method, a photosensitive layer provided on a substrate is irradiated by means of a modulated radiation beam which is focused to a scanning spot on the photosensitive layer by means of an optical lens system, the substrate and the lens system being moved relatively to each other, and a liquid being provided in a gap which is present between the photosensitive layer and a lens of the lens system facing said photosensitive layer.

The invention also relates to a device for the manufacture of a master mold, which is used in the manufacture of an optically scannable information carrier, which device is provided with a table which can be rotated about an axis of rotation, on which table a substrate with a photosensitive layer can be placed, and with a radiation source, an optical lens system for focusing a radiation beam generated in operation by the radiation source to a scanning spot on the photosensitive layer, a displacement device by means of which the lens system can be displaced with respect to the axis of rotation mainly in a radial direction, and a liquid supply means for providing a liquid in a gap between the photosensitive layer and a lens of the lens system facing said photosensitive layer.

A method and a device, of the types mentioned in the opening paragraphs, for the manufacture of a master mold are disclosed in JP-A-10255319. In accordance with the known method, a photosensitive layer is applied to a disc-shaped substrate made from glass. The substrate is secured onto a table of the known device. The table and the substrate are rotated about an axis of rotation extending perpendicularly to the substrate, and the lens system is displaced, at a comparatively low rate, in a radial direction with respect to the axis of rotation, so that the scanning spot of the radiation beam formed on the photosensitive layer follows a spiral-shaped track on the photosensitive layer. The radiation beam, which is a laser beam in the known device, is modulated such that a series of irradiated and non-irradiated elements is formed on the spiral-shaped track, which series correspond to a desired series of information elements on the information carrier to be manufactured. The photosensitive layer is subsequently developed, so that the irradiated elements are dissolved and a series of depressions are formed in the photosensitive layer. Next, a comparatively thin aluminum layer is sputtered onto the photosensitive layer, which aluminum layer is subsequently provided with a comparatively thick nickel layer by means of an electrodeposition process. The nickel layer thus formed is subsequently removed from the substrate and forms the master mold to be manufactured, which is provided, in the manner described above, with a disc-shaped surface having a series of raised portions corresponding to the desired series of information elements on the information carrier to be manufactured. The master mold thus manufactured can suitably be used in the manufacture of the desired information carriers, however, in general, a number of copies, so-called daughter molds are made by means of the master mold in a replica process. These daughter molds are used to manufacture the desired information carriers by means of a further replica process, generally an injection molding process. In this manner, the required number of master molds, which are comparatively expensive, is limited. Such a method of manufacturing an optically scannable information carrier, such as a CD or DVD, having pit-shaped information elements by means of a master mold or by means of a daughter mold manufactured by means of said master mold is commonly known and customary.

In accordance with the known method, the gap present between the photosensitive layer and the lens of the lens system facing said photosensitive layer is filled with water. For this purpose, the known device is provided with an outflow opening, which is situated near the axis of rotation of the table. The water supplied via the outflow opening is spread, under the influence of centrifugal forces, substantially throughout the surface of the photosensitive layer, so that also said gap is filled with water. Since water has a considerably larger optical refractive index than air, the provision of water in said gap leads to a substantial increase of an angle which the rays originating from the radiation beam and the optical axis of the lens system include at the location of the scanning spot. As a result, the scanning spot of the radiation beam on the photosensitive layer is reduced considerably, so that a much larger number of irradiated and non-irradiated elements can be formed on the photosensitive layer, and the information carrier to be manufactured has a higher information density.

A drawback of the known method and the known device resides in that the liquid film formed in said gap is not always homogenous as a result of air inclusions in said liquid film. As a result, impermissible faults develop in the photosensitive layer. In addition, the inhomogeneous liquid film exerts varying forces on the lens system. Since the lens system can be displaced in directions perpendicular and parallel to the photosensitive layer by means of an actuator to focus and position the radiation beam on the photosensitive layer, and this actuator has a limited rigidity in said directions, the varying forces exerted by the liquid film cause undesirable vibrations of the lens system in said directions, which may also lead to impermissible faults in the photosensitive layer. A further drawback of the known method and the known device resides in that a comparatively large quantity of liquid must be supplied. As a result, the known device must be provided with extensive measures to preclude undesirable contact between the liquid and other parts of the device.

It is an object of the invention to provide a method of manufacturing an optically scannable information carrier, a method of manufacturing a master mold, and a device for the manufacture of a master mold of the types mentioned in the opening paragraphs, wherein the above-mentioned drawbacks of the known method and the known device are precluded as much as possible.

To achieve this, a method in accordance with the invention for the manufacture of an optically scannable information carrier and a method in accordance with the invention for the manufacture of a master mold are characterized in that the liquid is provided via an outflow opening which, viewed in a displacement direction of the substrate at the location of the scanning spot relative to the lens system, is situated upstream from the scanning spot and directly adjacent said lens, said outflow opening being provided in a wall, which substantially extends in an imaginary plane wherein a side of the lens facing the photosensitive layer extends.

To achieve this object, a device in accordance with the invention for the manufacture of a master mold is characterized in that the liquid supply means comprises an outflow opening which, viewed in a tangential direction with respect to the axis of rotation, is situated upstream from the optical axis and directly adjacent said lens, said outflow opening being situated in a wall, which substantially extends in an imaginary plane wherein a side of the lens facing the photosensitive layer extends.

As the outflow opening is situated, viewed in the displacement direction of the substrate with respect to the lens system, upstream from the scanning spot, the liquid is transported from the outflow opening to the scanning spot under the influence of viscous forces exerted on the liquid as a result of the movement of the substrate with respect to the lens system. In the device in accordance with the invention, the liquid supply means is situated, viewed in the tangential direction with respect to the axis of rotation of the table, upstream from the optical axis of the lens system, because the direction wherein the substrate is displaced with respect to the lens system is substantially determined by the direction of rotation of the table. As the outflow opening is arranged directly adjacent the lens of the lens system facing the photosensitive layer, the liquid supplied is transported directly and substantially exclusively to the gap between the photosensitive layer and said lens. As a result, not the whole photosensitive layer has to be provided with liquid, but only a comparatively small part that is situated directly below the lens system. This leads to a substantial reduction of the quantity of liquid to be supplied. As the above-mentioned wall, wherein the outflow opening is formed, extends substantially in an imaginary plane wherein also the side of the lens facing the photosensitive layer extends, said wall substantially blends with said side of the lens. This results, if additionally the liquid is supplied at a sufficient flow rate and at sufficient pressure via the outflow opening, in a homogeneous Couette flow, i.e. a homogeneous liquid film without air inclusions having a linear speed profile, in the gap between the photosensitive layer and the lens. Said homogeneous Couette flow exerts a substantially constant force on the lens system, as a result of which undesirable vibrations of the lens system are precluded as much as possible.

A particular embodiment of a method in accordance with the invention for the manufacture of an optically scannable information carrier, and a particular embodiment of a method in accordance with the invention for the manufacture of a master mold are characterized in that the substrate is disc-shaped and rotated about an axis of rotation which extends perpendicularly to the substrate, while the lens system is displaced substantially in a radial direction with respect to the axis of rotation, the liquid being provided via an outflow opening which, viewed in a tangential direction with respect to the axis of rotation, is upstream from the scanning spot. In these particular embodiments, the substrate is rotated at a comparatively high speed about the axis of rotation, and the lens system is displaced at a comparatively low speed in the radial direction, so that a spiral-shaped track of irradiated and non-irradiated elements is formed on the photosensitive layer. The displacement direction of the substrate at the location of the scanning spot relative to the lens system, is substantially determined by the direction of rotation of the substrate. As the outflow opening, viewed in the tangential direction with respect to the axis of rotation, is upstream from the scanning spot, the liquid is transported, under the influence of the rotation of the substrate, from the outflow opening to the scanning spot which, viewed in the tangential direction, is situated downstream.

A particular embodiment of a method in accordance with the invention for the manufacture of an optically scannable information carrier, and a particular embodiment of a method in accordance with the invention for the manufacture of a master mold are characterized in that the liquid is provided via the outflow opening at a flow rate $\phi=0.5 \times V \times H \times W$, where W is at least equal to $2 \times H \times NA/\sqrt{(n^2-NA^2)}$, and where V is a velocity at which the substrate is displaced at the location of the scanning spot with respect to the lens system, H is a height dimension of the gap, W is a width over which the liquid, viewed in a direction perpendicular to the displacement direction, is spread into the gap, NA is a numerical aperture of the lens system, and n is an optical refractive index of the liquid.

A particular embodiment of a device in accordance with the invention is characterized in that a liquid flow provided, in operation, in the gap via the outflow opening has a flow rate $\phi=0.5 \times V \times H \times W$, where W is at least equal to $2 \times H \times NA/\sqrt{(n^2-NA^2)}$, and where V is a velocity of the substrate at the location of the optical axis with respect to the lens system, H is a height dimension of the gap, W is a width of the liquid flow, viewed in the radial direction, NA is a numerical aperture of the lens system, and n is an optical refractive index of the liquid.

The above-mentioned flow rate is necessary to obtain a homogeneous Couette flow in the gap without air inclusions and having a linear speed profile and a width W. By virtue of the fact that the width W of the liquid flow in the gap has at least the above-mentioned value, an optically effective portion of the lens, situated around the optical axis, is covered entirely with the liquid.

A particular embodiment of a method in accordance with the invention for the manufacture of an optically scannable information carrier, a particular embodiment of a method in accordance with the invention for the manufacture of a master mold, and a particular embodiment of a device in accordance with the invention are characterized in that the width W is at most approximately $10 \times H$. If W is approximately $10 \times H$, then the width of the liquid flow in the gap is approximately 2 to 3 times the above-mentioned minimally required width if water is used as the liquid and at customary values of the numerical aperture of the lens system. In this manner, the width of the liquid flow has a margin, so that the optically effective portion of the lens remains wholly covered with liquid also if, in operation, small deviations occur in the flow rate or in the direction of the liquid flow.

A particular embodiment of a method in accordance with the invention for the manufacture of an optically scannable information carrier, a particular embodiment of a method in accordance with the invention for the manufacture of a master mold, and a particular embodiment of a device in accordance with the invention are characterized in that the height H is at least approximately 4 $\mu$m and at most approximately 100 $\mu$m. It has been found that the methods and the device in accordance with the invention yield satisfactory results if the height H has a value which lies in the above-mentioned range. If the height H is smaller than 4 $\mu$m, there is a considerable risk of mechanical contact between the lens system and the substrate. If the height H exceeds 100 82 m, the necessary flow rate of the liquid flow in the gap is so high that there is a considerable risk of mechanical vibrations of the lens system and/or the substrate.

A particular embodiment of a method in accordance with the invention for the manufacture of an optically scannable information carrier, a particular embodiment of a method in accordance with the invention for the manufacture of a master mold, and a particular embodiment of a device in accordance with the invention are characterized in that the height H is at least approximately 7 µm and at most approximately 10 µm. It has been found that the methods and the device in accordance with the invention yield optimum results if the height H has a value in the above-mentioned range.

A particular embodiment of a method in accordance with the invention for the manufacture of an optically scannable information carrier, a particular embodiment of a method in accordance with the invention for the manufacture of a master mold, and a particular embodiment of a device in accordance with the invention are characterized in that the outflow opening is round and its diameter is at most approximately 0.5×W. To preclude air inclusions in the liquid flow in the gap, a predetermined, minimum outflow pressure of the liquid flow in the outflow opening is required. At a predetermined flow rate of the liquid flow, the outflow pressure decreases as the outflow opening increases, so that the risk of air inclusions increases as the outflow opening is larger. It has been found that the risk of air inclusions is negligibly small if the outflow opening is round with a diameter which is at most equal to approximately 0.5×W.

A particular embodiment of a device in accordance with the invention is characterized in that the side of the lens facing the photosensitive layer is provided with a dam which, viewed in the tangential direction, extends upstream from the optical axis and has a width which is equal to a desired width W of the liquid flow, while the outflow opening is provided in a further dam, which has the same width and, viewed in the tangential direction, connects to the dam of the lens. In this particular embodiment of the device in accordance with the invention, the wall having the outflow opening is formed by a side of said further dam, which side faces the photosensitive layer. The liquid flow present in the gap between the dam, the further dam and the photosensitive layer is retained in the gap, viewed at right angles to the flow direction, under the influence of capillary liquid forces. As a result, at a sufficiently high flow rate of the liquid flow, the dam and the further dam accurately determine the width and the position of said liquid flow, so that only a comparatively small margin with respect to the minimally required width of the liquid flow is necessary to always cover, in operation, the optically effective portion of the lens with liquid. In addition, in this particular embodiment, the varying forces exerted by the liquid flow on the lens system are further reduced.

A particular embodiment of a method in accordance with the invention for the manufacture of an optically scannable information carrier, and a particular embodiment of a method in accordance with the invention for the manufacture of a master mold are characterized in that the liquid is extracted from the photosensitive layer, viewed in the displacement direction, downstream from the lens system.

A particular embodiment of a device in accordance with the invention is characterized in that the device comprises an extraction device which is arranged downstream, viewed with respect to the outflow opening and the lens system. As the liquid is extracted from the photosensitive layer downstream from the lens system, it is substantially precluded that liquid that has already been used is re-introduced into the gap and disturbs the liquid flow in the gap that is supplied via the outflow opening.

A particular embodiment of a device in accordance with the invention is characterized in that the extraction device has an extraction mouth which can be displaced, by means of a further displacement device, synchronously with the lens system in a further radial direction with respect to the axis of rotation. The extraction mouth is displaced by means of the further displacement device in such a way that, in operation, the extraction mouth is always situated at a distance from the axis of rotation which corresponds to a distance between the lens system and the axis of rotation. In this manner, a practical structure of the extraction device is obtained, and the extraction mouth has minimum dimensions.

These and other aspects of the invention will be apparent from and elucidated with reference to the embodiment(s) described hereinafter.

Figure 1B:
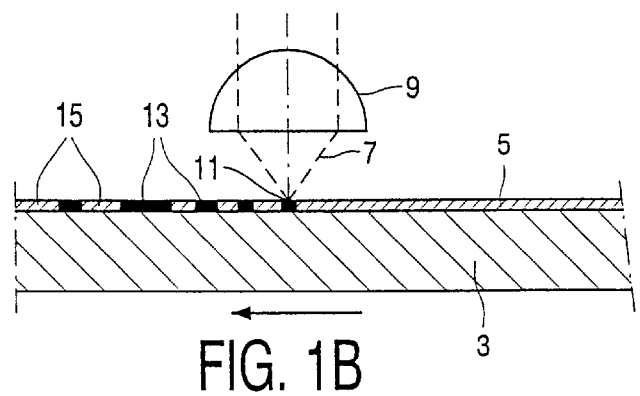
Figure 1C:
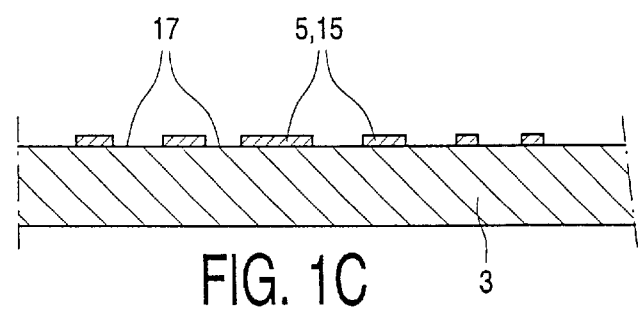
Figure 1D:
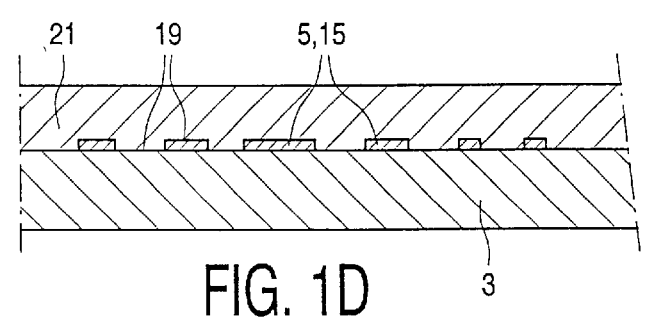
Figure 1E:
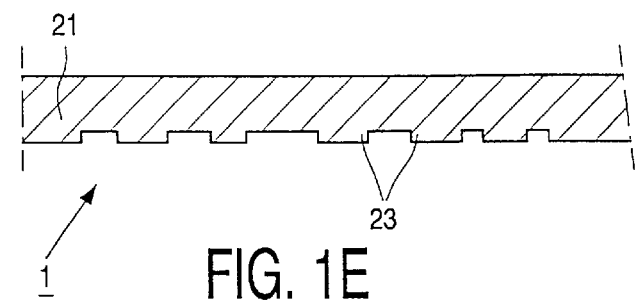
Figure 2:
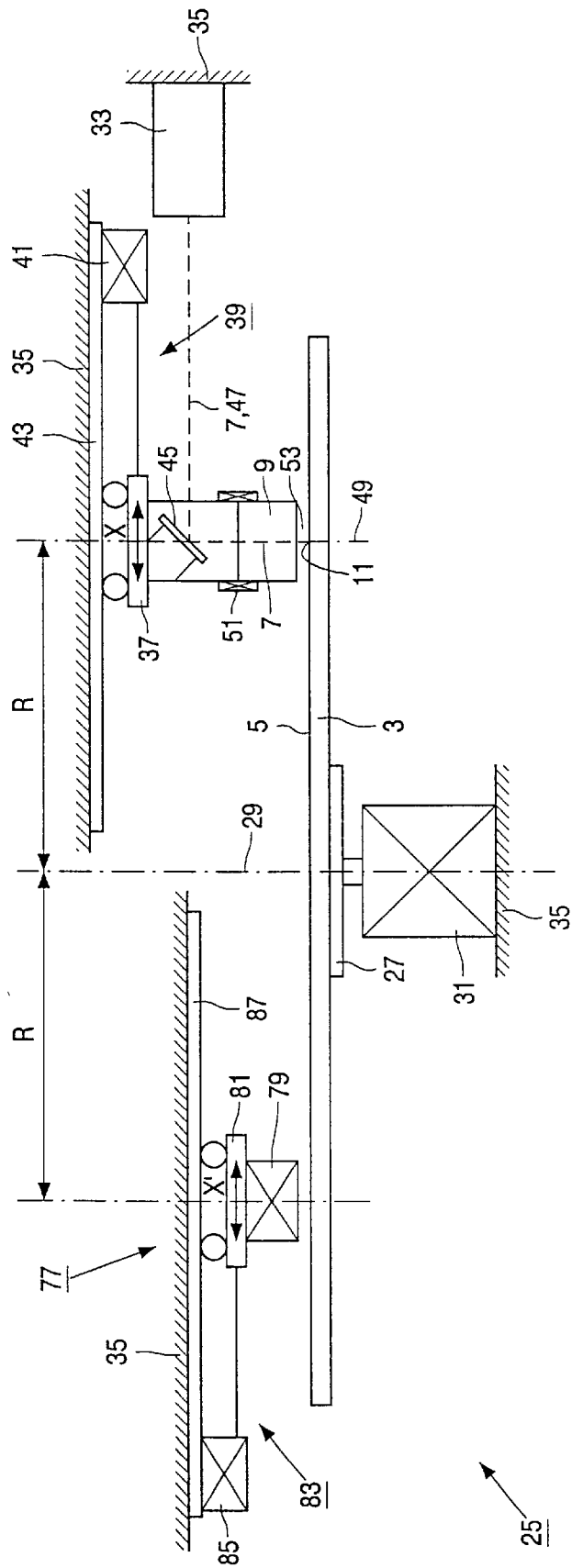
Figure 3:
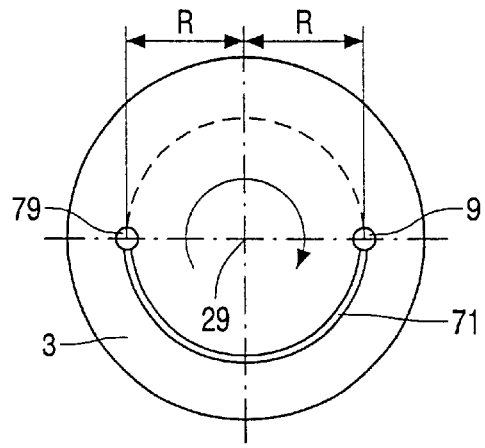
Figure 4:
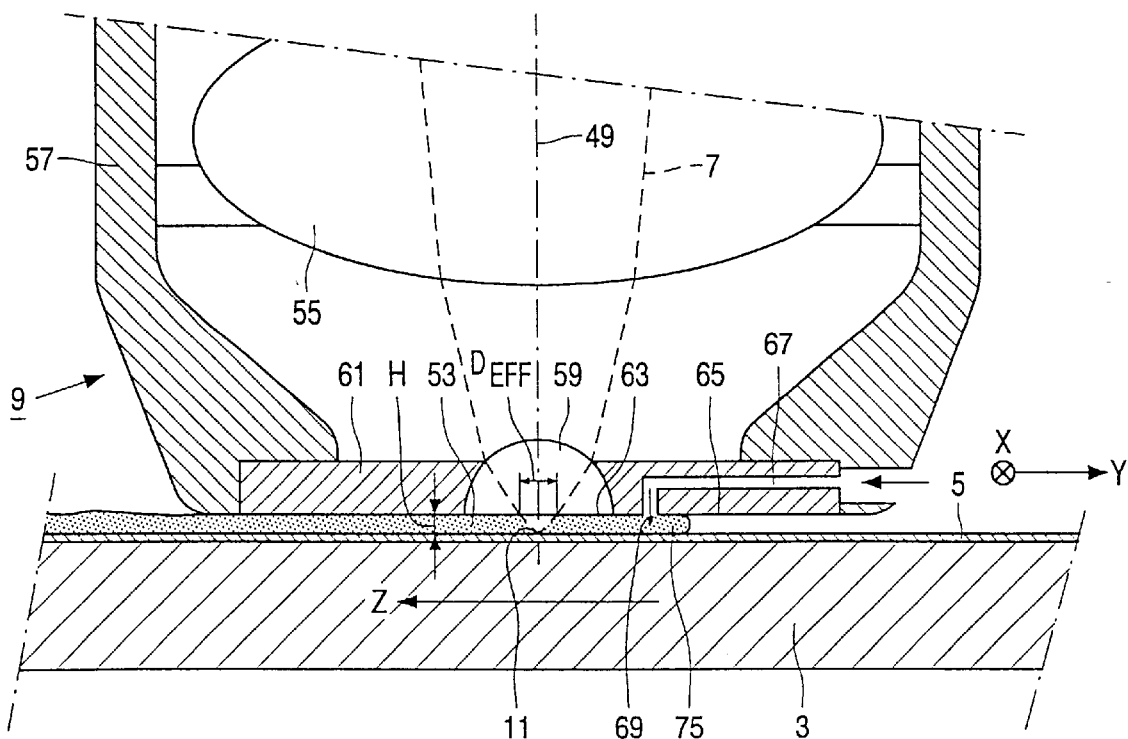
Figure 5:
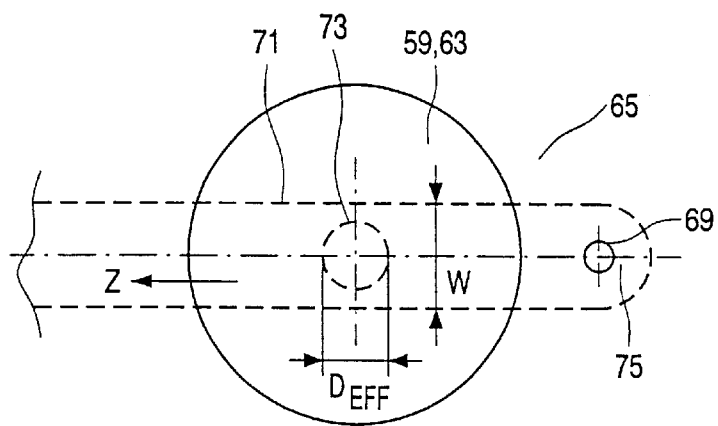
Figure 5:
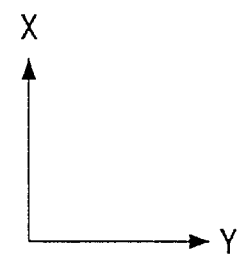
Figure 6:
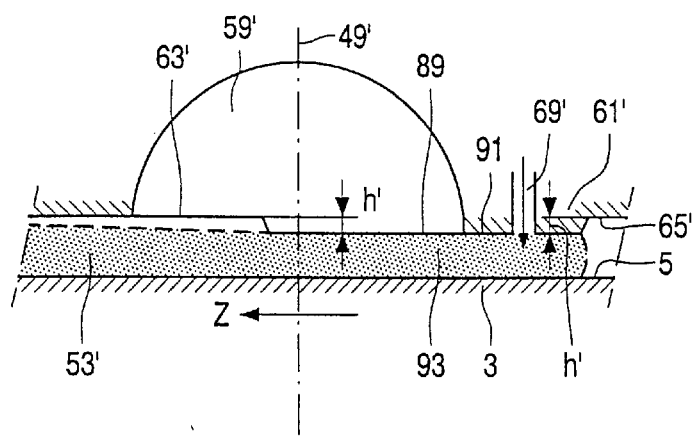
Figure 6:

In the drawings:

FIGS. 1a through 1e diagrammatically show a number of steps of a method in accordance with the invention for the manufacture of an optically scannable information carrier, and of a method in accordance with the invention for the manufacture of a master mold which is used in the manufacture of an optically scannable information carrier, FIG. 2 diagrammatically shows a device in accordance with the invention, which is used in the methods shown in FIGS. 1a through 1e, FIG. 3 is a diagrammatic, plan view of a substrate which is processed by means of the device shown in FIG. 2, FIG. 4 is a diagrammatic, cross-sectional view of a lens system of the device shown in FIG. 2 and of a substrate situated below said lens system, FIG. 5 is a diagrammatic, bottom view of the lens system shown in FIG. 4, and of a liquid flow present between the lens system and the substrate, FIG. 6 is a diagrammatic, cross-sectional view of a substrate and a lens system situated above it in an alternative embodiment of a device in accordance with the invention, which can be used in the methods shown in FIGS. 1a through 1e, and FIG. 7 is a diagrammatic, bottom view of the lens system shown in FIG. 6 and of a liquid flow present between the lens system and the substrate.

FIGS. 1a through 1e show a number of steps of a method in accordance with the invention for the manufacture of a master mold 1, which is used in the manufacture of an optically scannable information carrier, such as a CD or a DVD. The steps shown in FIGS. 1a through 1e thus also are a number of steps of a method in accordance with the invention for the manufacture of an optically scannable information carrier. FIG. 1a shows a part of a disc-shaped substrate 3 of glass. In accordance with these methods, the substrate 3 is provided, first on one side, with a thin photosensitive layer 5. As shown in FIG. 1b, the photosensitive layer 5 is subsequently irradiated by means of a modulated radiation beam 7, in the example shown a DUV laser beam with a wavelength of approximately 260 nm. To irradiate the photosensitive layer 5, use is made of a device in accordance with the invention, which device will be described hereinafter with reference to FIGS. 2 through 7. The radiation beam 7 is focused to a scanning spot 11 on the photosensitive layer 5 by means of an optical lens system 9 of the device which is diagrammatically shown in FIG. 1b. The substrate 3 and the lens system 9 are displaced with respect to each other by means of the device, so that the modulated radiation beam 7 on the photosensitive layer 5 forms a series of irradiated elements 13 and non-irradiated elements 15. Said series corresponds to a series of information elements to be formed on the information carrier to be manufactured. The methods in accordance with the example can suitably be used to manufacture information carriers provided with an information layer having pit-shaped information elements, the irradiated elements 13 shown in FIG. 1b corresponding to the desired pit-shaped information elements. The irradiated photosensitive layer 5 is subsequently developed by means of a developing liquid, which dissolves the irradiated elements 13 and leaves the non-irradiated elements 15 on the substrate 3. In this manner, a series of pits 17, shown in FIG. 1c, which correspond to the desired pit-shaped information elements on the information carrier, are formed in the photosensitive layer 5. As shown in FIG. 1d, the photosensitive layer 5 is subsequently covered with a comparatively thin layer of aluminum 19 by means of a sputtering process, whereafter said aluminum layer is covered with a comparatively thick nickel layer 21 in an electrodeposition process. The nickel layer 21 thus formed is the master mold 1 to be manufactured, which is eventually removed from the substrate 3, as shown in FIG. 1e. The master mold 1 is a negative of the information carrier to be manufactured, i.e. the master mold 1 comprises a series of raised portions 23, which correspond to the desired series of pit-shaped information elements on the information carrier. The master mold 1 is thus rendered suitable for use as a mold in an injection molding machine for injection molding the desired information carriers. Generally, however, a copy of the master mold 1 is used as the mold for injection molding instead of the master mold 1, which copy of the master mold is commonly referred to as daughter mold, which is manufactured by means of said master mold 1 using a customary replica process which is known per se. By manufacturing a large number of daughter molds by means of the master mold 1, the number of comparatively expensive master molds necessary for the manufacture of a large series of identical information carriers is reduced substantially.

FIG. 2 diagrammatically shows a device 25 in accordance with the invention, which is used in the manufacture of the master mold 1. As described hereinabove, the device 25 is used to irradiate the photosensitive layer 5, i.e. to form the desired series of irradiated and non-irradiated elements on the photosensitive layer 5. The device 25 comprises a table 27 on which the substrate 3 with the photosensitive layer 5 is placed. The table 27 is rotatable about an axis of rotation which extends perpendicularly to the table 27 and the substrate 3, which table can be driven by means of a first electric motor 31. The device 25 further comprises a radiation source 33, which, in the example shown, is a laser source which is secured in a fixed position to a frame 35 of the device 25. The above-mentioned optical lens system 9 of the device 25 is secured onto a first slide 37 of the device 25, which can be displaced, by means of a first displacement device 39 of the device 25, parallel to a direction which, with respect to the axis of rotation 29, is a radial X-direction. For this purpose, the first displacement device 39 comprises a second electric motor 41 by means of which the first slide 37 can be displaced over a straight guide 43, which extends parallel to the X-direction and is secured to the frame 35. A mirror 45 is also secured to the first slide 37. A radiation beam 7 generated, in operation, by the radiation source 33 follows a radiation beam path 47 extending parallel to the X-direction, and said radiation beam is deflected by the mirror 45 in a direction parallel to an optical axis 49 of the lens system 9. The lens system 9 can be displaced, by means of a focus actuator 51, over comparatively small distances with respect to the first slide 37 in a direction parallel to the optical axis 49. By displacing the lens system 9 by means of the focus actuator 51 in a direction parallel to the optical axis 49, the radiation beam 7 can be focused on the photosensitive layer 5. In operation, the table 27 with the substrate 5 is rotated about the axis of rotation 29 at a comparatively high speed by means of a first motor 31, and the lens system 9 is displaced in a direction parallel to the radial X-direction by means of the second motor 41 at a comparatively low rate, so that the scanning spot 11 of the radiation beam 7 follows a spiral-shaped track on the photosensitive layer 5, and the series of irradiated and non-irradiated elements is provided on the photosensitive layer 5 in accordance with this spiral-shaped track.

The device 25 can suitably be used to manufacture master molds having a comparatively high information density, i.e. by means of the device 25, a comparatively large number of irradiated elements can be provided per unit area of the photosensitive layer 5. The attainable information density increases as the scanning spot 11 is smaller. The size of the scanning spot 11 is determined by the wavelength of the radiation beam 7 and by the numerical aperture NA of the lens system 9, with the numerical aperture NA depending upon the optical refractive index n of the medium present between the lens system 9 and the photosensitive layer 5. The scanning spot 11 is smaller as said refractive index is larger. By means of the device 25 in accordance with the invention, and by means of the methods in accordance with the invention to be carried out using said device, a comparatively high information density can be attained in that water having a much larger optical refractive index than air is provided in the gap 53 between the lens system 9 and the photosensitive layer 5. In the example shown, water can suitably be used for this purpose because it is transparent to the DUV radiation beam 7 used and it does not attack the photosensitive layer 5. Liquids other than water which also have a comparatively large optical refractive index, are transparent to the radiation beam 7 and do not attack the photosensitive layer 5, can alternatively be used.

FIG. 4 shows in detail a cross-sectional view of the lens system 9, the substrate 3 with the photosensitive layer 5, and the gap 53 between the photosensitive layer 5 and the lens system 9. The lens system 9 comprises an objective lens 55, which is secured in a lens holder 57. The lens system 9 further comprises a comparatively small auxiliary lens 59, which is provided on a side of the lens system 9 facing the substrate 3. Said auxiliary lens 59 is secured in a plate-shaped carrier 61 and includes a flat side 63 facing the substrate 3. The carrier 61 shuts off a space enclosed by the lens holder 57 and includes a flat wall 65, which faces the substrate 3 and which substantially extends in an imaginary plane wherein also said side 63 of the auxiliary lens 59 extends. In the carrier 61, a liquid supply 67 is provided which opens into an outflow opening 69 formed in the wall 65. In accordance with the invention, the outflow opening 69 is directly adjacent the auxiliary lens 59, viewed from the optical axis 49 and the scanning spot 11 in a direction contrary to the displacement direction Z shown in FIG. 4, which is the direction wherein the substrate 3 is displaced, at the location of the optical axis 49 and the scanning spot 11, with respect to the lens system 9. The water, which is supplied via the outflow opening 69, is thus entrained, under the influence of the movement of the substrate 3 with respect to the lens system 9, from the outflow opening 69 in the displacement direction Z towards the scanning spot 11 situated downstream. The outflow opening 69 is thus situated, viewed in said displacement direction Z, upstream from the scanning spot 11 and the optical axis 49. As, in the case of the device 25, the speed of rotation of the substrate 3 is comparatively high with respect to the speed at which the lens system 9 is displaced in the radial X direction, said displacement direction Z is substantially determined by the direction of rotation of the substrate 3. For this reason, the outflow opening 69, viewed in a Y direction that is tangential with respect to the axis of rotation 29 and perpendicular with respect to the radial X direction, is situated upstream from the optical axis 49. As the outflow opening 69 is provided directly adjacent the auxiliary lens 59, the water supplied via the outflow opening 69 is transported directly and substantially exclusively to the gap 53. To fill the gap 53 with water, the water thus has to be supplied only at a comparatively low flow rate from the outflow opening 69. The wall 65 wherein the outflow opening 69 is formed and the side 63 of the auxiliary lens 59 facing the substrate 3 substantially blend with each other. As a result, if the water is additionally supplied at a sufficiently high flow rate and pressure via the outflow opening 69, a homogeneous Couette flow is present in the gap 53, i.e. a homogeneous water film without air inclusions and a substantially linear speed profile. Such a Couette flow exerts a substantially constant force on the wall 65 and on the side 63 of the auxiliary lens 59. As a result, the water present in the gap 53 exerts substantially no variable liquid forces on the lens system 9. Such varying liquid forces would lead to undesirable vibrations of the lens system 9 and hence to impermissible focusing errors and positioning errors of the radiation beam 7 on the photosensitive layer 5. As the Couette flow is free of air inclusions, the radiation beam 7 present in the gap 53 is not disturbed by air inclusions. Such air inclusions also lead to impermissible focusing and positioning errors.

FIG. 5 diagrammatically shows a bottom view of the auxiliary lens 59 and the wall 65, a liquid flow 71, indicated by means of broken lines, being present in the gap 53. FIG. 5 also shows an optically effective portion 73 of the auxiliary lens 59, which is formed by a circle of diameter $D_{EFF}$, according to which the side 63 of the auxiliary lens 59 is intersected by the outermost rays of the radiation beam 7. The diameter $D_{EFF}$ is also shown in FIG. 4. The diameter $D_{EFF} = 22 \times H \times NA/\sqrt{(n^2 - NA^2)}$, where H is the height of the gap 53 shown in FIG. 4, NA is the numerical aperture of the lens system 9, and n is the optical refractive index of the water in the gap 53. In order to fully cover the optically effective portion 73 of the auxiliary lens 59 with water, i.e. in order to make sure that the radiation beam 7 in the gap 53 passes entirely through the water, the liquid flow 71 in the gap 53 must have a width W which is at least equal to said diameter $D_{EFF}$. To attain a homogeneous Couette flow of desired width W, the water is supplied via the outflow opening 69 at a flow rate $\phi = 0.5 \times V \times H \times W$, where H is the height of the gap 53 and V is the velocity of the substrate 3 at the location of the optical axis 49 and the scanning spot 11 with respect to the lens system 9. As shown in FIG. 5, the width W in the example shown is larger than said diameter $D_{EFF}$. As a result of the margin of the width W thus obtained, it is precluded that the optically effective portion 73 of the auxiliary lens 59 is not wholly covered with water if, in operation, small deviations of the flow rate or the direction of the liquid flow 71 occur. In practice, a useful margin is obtained if W is at most approximately 2 to 3 times the diameter $D_{EFF}$. In that case, at customary values of the numerical aperture of the lens system 9, W is at most approximately 10 times the height H.

In the example shown in FIG. 4, the height H of the gap 53 is approximately 10 µm. The height H preferably is not less than approximately 4 µm in order to preclude mechanical contact between the lens system 9 and the photosensitive layer 5. The height H preferably also does not exceed approximately 100 µm in order to preclude too large a flow rate of the liquid flow 71 in the gap 53. At such a high flow rate of the liquid flow 71, the risk of mechanical vibrations of the lens system 9 increases substantially. It has been found that by using the methods and the device in accordance with the invention, optimum results are achieved if the height H is at least approximately 7 µm and at most approximately 10 µm. In addition, the water should be supplied from the outflow opening 69 at a sufficient outflow pressure. If the outflow pressure is too low, there is a considerable risk of undesirable air inclusions in the liquid flow 71. As the outflow pressure necessary to attain a predetermined value of the flow rate of the liquid flow 71 decreases as the size of the outflow opening 69 increases, the size of outflow opening 69 should be small enough. In the example shown in FIG. 4 and FIG. 5, wherein the outflow opening 69 is round, it has been found that the diameter of the outflow opening 69 must not exceed 0.5×W in order to preclude air inclusions, W being the width of the liquid flow 71 in the gap 53. At a sufficiently high outflow pressure, air inclusions are precluded by the fact that a part of the water leaving the outflow opening 69 first flows in a direction contrary to the direction of displacement Z. Said part of the water, referenced 75 in FIG. 4 and FIG. 5, is subsequently entrained in the displacement direction Z, so that this part 75 is spread around the outflow opening 69 thereby forming a water barrier against air inclusions.

As shown in FIG. 2, the device 25 further comprises an extraction device 77, which is provided with an extraction mouth 79. In the example shown, the extraction mouth 79 is secured onto a second slide 81 of the device 25, which can be displaced by means of a second displacement device 83 of the device 25 in a direction which, with respect to the axis of rotation 29, is parallel to a radial X'-direction. For this purpose, the second displacement device 83 comprises a third electric motor 85 by means of which the second slide 81 can be displaced over a straight guiding means 87, which is attached to the frame 35 and extends in a direction parallel to the X'-direction. The diagrammatic plan view shown in FIG. 3 shows that the extraction mouth 79 is arranged, viewed with respect to the axis of rotation 29, diametrically opposite the lens system 9. In operation, the extraction mouth 79 is displaced synchronously with the lens system 9 by means of the third motor 85, the lens system 9 and the extraction mouth 79 being continuously situated at substantially equal distances R from the axis of rotation 29. In this manner, the extraction mouth 79 is arranged downstream from the lens system 9, so that the liquid flow 71 supplied at the location of the lens system 9, which liquid flow, as shown in FIG. 3, is entrained by the rotating substrate 3, is extracted from the photosensitive layer 5 by the extraction mouth 79. As the water is thus extracted from the photosensitive layer 5 downstream from the lens system 9, it is substantially precluded that water that has already been used finds its way back to the gap 53, thereby disturbing the accurately dosed liquid flow 71 in the gap 53. As the extraction mouth 79 is displaced synchronously with the lens system 9 in the radial X'-direction by means of the third motor 85, so that, in operation, the extraction mouth 79 is always at a distance from the axis of rotation 29 which corresponds to the distance at which the lens system 9 is situated from the axis of rotation 29, both the dimensions and the extraction power of the extraction mouth 79 only have to be comparatively small to extract water that has already been used.

Figure 7:
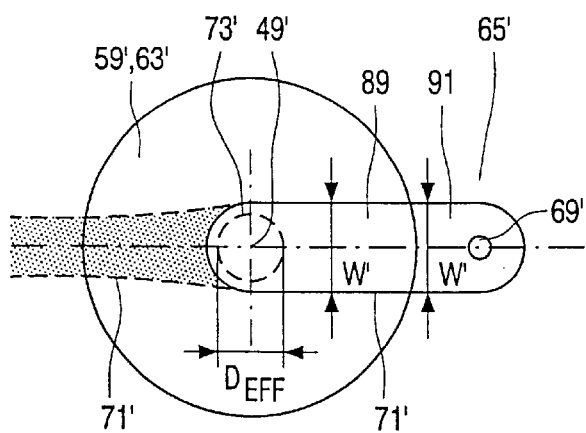
Figure 7:
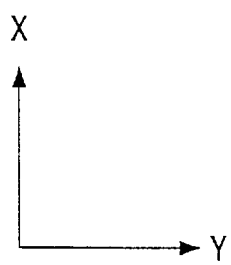

An alternative embodiment of a device in accordance with the invention differs from the device 25 described hereinabove in that the side 63' of the auxiliary lens 59' facing the photosensitive layer 5, as diagrammatically shown in FIG. 6 and FIG. 7, is provided with a dam 89. In FIG. 6 and FIG. 7, parts of the alternative embodiment of the device which correspond to parts of the device 25 are indicated by means of corresponding reference numerals. In the following, only the differences between the alternative embodiment of the device and the device 25 are discussed. The dam 89 extends, viewed in the tangential Y-direction, upstream from the optically effective portion 73' of the auxiliary lens 59' as far as the edge of the auxiliary lens 59'. The outflow opening 69' is provided in a further dam 91, which is provided on the wall 65' of the carrier 61' and extends, viewed in the tangential Y-direction, from the dam 89 beyond the outflow opening 69'. The dam 89 and the further dam 91 both are equal in width W' and in height h', so that the dam 89 and the further dam 91 blend with each other, viewed in the tangential Y-direction. If, in operation, water is supplied at a sufficient flow rate via the outflow opening 69', a Couette flow develops in a gap 93 present between the dams 89, 91 and the photosensitive layer 5, which Couette flow is maintained in the gap 93, viewed at right angles to the Y-direction, under the influence of capillary liquid forces. The dams 89, 91 thus determine the position and the width of the liquid flow 71'in the gap 93. As the position and the width of the liquid flow 71' in the gap 93 and at the location of the optically effective portion 73' of the auxiliary lens 59' are thus accurately determined, the above-mentioned necessary margin with respect to the minimally required width of the liquid current 71' can be limited. For this reason, it is shown in FIG. 7 that, in this example, the width W' of the dams 89, 91 only slightly exceeds the diameter $D_{EFF}$ of the optically effective portion 73' of the auxiliary lens 59'. In addition, as a result of the limited width and the limited length of the dam 89, the liquid forces acting on the auxiliary lens 59' are further limited, so that the risk of undesirable mechanical vibrations of the lens system 9 is further reduced.

It is to be noted that the results obtained are better as the outflow opening 69, 69' is closer to the auxiliary lens 59, 59' and closer to the optically effective portion thereof. In a device in accordance with the invention, the outflow opening may theoretically even be provided in the side of the auxiliary lens facing the photosensitive layer and outside the optically effective portion thereof. In practice, however, the provision of an outflow opening in the auxiliary lens proves to be very laborious.

It is further noted that instead of the above-mentioned round outflow opening 69, 69', an outflow opening of a different shape may alternatively be used, such as a slit-shaped outflow opening extending perpendicularly to the displacement direction of the substrate with respect to the lens system.

It is finally noted that the invention is not limited to methods wherein the process steps shown in FIG. 1a through FIG. 1e are followed. The invention also includes other methods, wherein a master mold is manufactured in accordance with a process comprising at least a step wherein a photosensitive layer provided on a substrate is irradiated by means of a modulated radiation beam, and wherein an optically scannable information carrier is manufactured by means of this master mold or a daughter mold manufactured by means of this master mold using a suitable replica process.

What is claimed is:

1. A method of manufacturing an optically scannable information carrier, which method comprises a first step wherein a master mold is manufactured, and a second step wherein, by means of the master mold or by means of a daughter mold manufactured by means of said master mold, the information carrier is manufactured by means of a replica process, in which first step a photosensitive layer provided on a substrate is irradiated by means of a modulated radiation beam which is focused to a scanning spot on the photosensitive layer by means of an optical lens system, the substrate and the lens system being moved relatively to each other, and a liquid being provided in a gap which is present between the photosensitive layer and a lens of the lens system facing said photosensitive layer, characterized in that the liquid is provided via an outflow opening which, viewed in a displacement direction of the substrate at the location of the scanning spot relative to the lens system, is situated upstream from the scanning spot and directly adjacent said lens, said outflow opening being provided in a wall formed in a carrier for said lens, which wall substantially extends in an imaginary plane wherein a side of the lens facing the photosensitive layer extends.

2. A method of manufacturing a master mold, which is used in the manufacture of an optically scannable information carrier, according to which method, a photosensitive layer provided on a substrate is irradiated by means of a modulated radiation beam which is focused to a scanning spot on the photosensitive layer by means of an optical lens system, the substrate and the lens system being moved relatively to each other, and a liquid being provided in a gap which is present between the photosensitive layer and a lens of the lens system facing said photosensitive layer, characterized in that the liquid is provided via an outflow opening which, viewed in a displacement direction of the substrate at the location of the scanning spot relative to the lens system, is situated upstream from the scanning spot and directly adjacent said lens, said outflow opening being provided in a wall, formed in a carrier for said lens which wall substantially extends in an imaginary plane wherein a side of the lens facing the photosensitive layer extends.

3. A method as claimed in claim 1, characterized in that the substrate is disc-shaped and rotated about an axis of rotation which extends perpendicularly to the substrate, while the lens system is displaced substantially in a radial direction with respect to the axis of rotation, the liquid being provided via an outflow opening which, viewed in a tangential direction with respect to the axis of rotation, is upstream from the scanning spot.

4. A method as claimed in claim 1, characterized in that the liquid is provided via the outflow opening at a flow rate $\phi=0.5 \times V \times H \times W$, where W is at least equal to $2 \times H \times NA/\sqrt{n^2-NA^2}$, and where V is a velocity at which the substrate is displaced at the location of the scanning spot with respect to the lens system, H is a height dimension of the gap, W is a width over which the liquid, viewed in a direction perpendicular to the displacement direction, is spread into the gap, NA is a numerical aperture of the lens system, and n is an optical refractive index of the liquid.

5. A method as claimed in claim 4, characterized in that the width W is at most approximately $10 \times H$.

6. A method as claimed in claim 4, characterized in that the height H is at least approximately 4 μm and at most approximately 100 μm.

7. A method as claimed in claim 6, characterized in that the height H is at least approximately 7 μm and at most approximately 10 μm.

8. A method as claimed in claim 4, characterized in that the outflow opening is round and its diameter is at most approximately 0.5×W.

9. A method as claimed in claim 1, characterized in that the liquid is extracted from the photosensitive layer, viewed in the displacement direction, downstream from the lens system.

10. A device for the manufacture of a master mold, which is used in the manufacture of an optically scannable information carrier, which device is provided with a table which can be rotated about an axis of rotation, on which table a substrate with a photosensitive layer can be placed, and with a radiation source, an optical lens system for focusing a radiation beam generated in operation by the radiation source to a scanning spot on the photosensitive layer, a displacement device by means of which the lens system can be displaced with respect to the axis of rotation mainly in a radial direction, and a liquid supply means for providing a liquid in a gap between the photosensitive layer and a lens of the lens system facing said photosensitive layer, characterized in that the liquid supply means comprises an outflow opening which, viewed in a tangential direction with respect to the axis of rotation, is situated upstream from the optical axis and directly adjacent said lens, said outflow opening being situated in a wall formed in a carrier for said lens, which wall substantially extends in an imaginary plane wherein a side of the lens facing the photosensitive layer extends.

11. A device as claimed in claim 10, characterized in that a liquid flow provided, in operation, in the gap via the outflow opening has a flow rate $\phi=0.5\times V\times H\times W$, where W is at least equal to $2\times H\times NA/\sqrt{(n^2-NA^2)}$, and where V is a velocity of the substrate at the location of the optical axis with respect to the lens system, H is a height dimension of the gap, W is a width of the liquid flow, viewed in the radial direction, NA is a numerical aperture of the lens system, and n is an optical refractive index of the liquid.

12. A device as claimed in claim 11, characterized in that the width W is at most approximately 10×H.

13. A device as claimed in claim 11, characterized in that the height H is at least approximately 4 μm and at most approximately 100 μm.

14. A device as claimed in claim 13, characterized in that the height H is at least approximately 7 μm and at most approximately 10 μm.

15. A device as claimed in claim 11, characterized in that the outflow opening is round and has a diameter which is at most approximately 0.5×W.

16. A device as claimed in claim 11, characterized in that the side of the lens facing the photosensitive layer is provided with a dam which, viewed in the tangential direction, extends upstream from the optical axis and has a width which is equal to a desired width W of the liquid flow, while the outflow opening is provided in a further dam, which has the same width and, viewed in the tangential direction, connects to the dam of the lens.

17. A device as claimed in claim 10, characterized in that the device comprises an extraction device which is arranged downstream, viewed with respect to the outflow opening and the lens system.

18. A device as claimed in claim 17, characterized in that the extraction device has an extraction mouth which can be displaced, by means of a further displacement device, synchronously with the lens system in a further radial direction with respect to the axis of rotation.

* * * * *